(12) United States Patent  (10) Patent No.: US 8,102,491 B2
Ishida et al.  (45) Date of Patent: Jan. 24, 2012

(54) LIQUID CRYSTAL APPARATUS AND METHOD OF PRODUCING THE SAME

(75) Inventors: Yohei Ishida, Honjo (JP); Akira Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 296 days.

(21) Appl. No.: 12/496,201

(22) Filed: Jul. 1, 2009

(65) Prior Publication Data

US 2010/0007831 A1  Jan. 14, 2010

(30) Foreign Application Priority Data

Jul. 10, 2008 (JP) ................. 2008-180739
Jul. 14, 2008 (JP) ................. 2008-183139

(51) Int. Cl.
*G02F 1/1337* (2006.01)
*G02F 1/139* (2006.01)

(52) U.S. Cl. ........ 349/123; 349/124; 349/125; 349/128; 349/129; 349/139

(58) Field of Classification Search .......... 349/125, 349/136, 143, 177, 187, 139; 428/1.21
See application file for complete search history.

(56) References Cited

U.S. PATENT DOCUMENTS 5,268,781 A  12/1993  Shigeta et al. ................. 359/76
2003/0020857 A1*  1/2003  Konno et al. ................. 349/123
2006/0203171 A1  9/2006  Ozawa ................. 349/143
2007/0115235 A1*  5/2007  Park ................. 345/93
2007/0206151 A1  9/2007  Sakai et al.
2008/0186438 A1  8/2008  Sakai et al.
2009/0109387 A1  4/2009  Sakai et al.
2009/0257013 A1  10/2009  Sakai et al.

FOREIGN PATENT DOCUMENTS

JP  2000-330141  11/2000
JP  2007-17502  1/2007

* cited by examiner

*Primary Examiner* — Dung Nguyen
*Assistant Examiner* — Tai Duong
(74) *Attorney, Agent, or Firm* — Fitzpatrick, Cella, Harper & Scinto

(57) ABSTRACT

A liquid crystal apparatus includes a display region in which electrodes are disposed in a matrix pattern, a non-display region provided at a periphery of the display region, and a liquid crystal disposed in the display region and non-display region. The liquid crystal disposed in the display region is splay-aligned when a voltage is not applied and bend-aligned when the voltage is applied. The liquid crystal disposed in the non-display region is bend-aligned. The apparatus also includes an alignment film including an inorganic material provided in at least one of a pair of substrates. The thickness of the alignment film provided in the display region is smaller than the thickness of the alignment film provided in the non-display region.

5 Claims, 10 Drawing Sheets

DEPOSITION DIRECTION

DEPOSITION DIRECTION

ION BEAM IRRADIATION DIRECTION

LIQUID CRYSTAL APPARATUS AND METHOD OF PRODUCING THE SAME

BACKGROUND OF THE INVENTION

1. Field of the Invention

The present invention relates to a liquid crystal apparatus and a method of producing the same and, more particularly, to a liquid crystal apparatus using a bend alignment mode that can realize a high-speed response and a method of producing the same.

2. Description of the Related Art

In general, various alignment modes of liquid crystal have been used for a liquid crystal device depending on the intended use. For example, a Twisted Nematic (TN) mode, a Vertical Aligned (VA) mode, an In Plane Switching (IPS) mode, and an Optically Compensated Bend (OCB) mode are well known. These liquid crystal alignment modes may be determined depending on the physical property of a liquid crystal composition and the characteristics of an alignment film.

In recent years, in order to display a moving picture, a liquid crystal apparatus that has a high-speed response has been actively developed. In particular, the OCB mode has attracted attention, because the OCB has a high-speed response.

During the OCB mode, a liquid crystal alignment state that is called bend alignment is used at the time of a display operation. However, in order to form the bend alignment, an alignment transition from splay alignment of an initial alignment state becomes necessary. For this alignment transition, a transition voltage larger than or equal to a predetermined voltage is needed. If the transition voltage is increased, the driving voltage of the liquid crystal device is increased. Accordingly, the transition voltage is preferably maintained as low as possible.

It is known that in general, it is effective to increase a pretilt angle of liquid crystal layer and decrease an elastic constant ($K_{33}/K_{11}$) of a liquid crystal composition in order to decrease the transition voltage. In particular, if the pretilt angle is set to 40° or more, the transition voltage becomes unnecessary. As a result, the bend alignment can be formed without the alignment transition from the splay alignment state.

Meanwhile, if the pretilt angle is set to a high value, it is likely to generate the bend transition. However, there is posed a problem that the retardation of the liquid crystal layer is lowered, whereby the light utilization efficiency is lowered. In order to solve this problem, a technology for easily realizing a bend alignment transition even eat a low pretilt angle has been reported.

In Japanese Patent Application Laid-Open No. 2007-017502, a region where a plurality of pretilt angles are implemented is formed in a substrate plane. Specifically, a low pretilt angle region is surrounded by a high pretilt angle region to improve the ease with which the splay/bend alignment transition is generated.

The above-mentioned patent document discloses a method of forming a low pretilt angle region. According to this method, after a high pretilt angle region is formed on a substrate using an oblique deposition method where a deposition angle is 80°, a deposition region is restricted to only a pixel region using a mask, the substrate is rotated by 90° to change a deposition direction by 90°, and an oblique deposition film is formed at a deposition angle of 60°. By using this method, the pixel region comes to have a low pretilt angle by using a deposition angle of 60°, and an inter-pixel region comes to have a high pretilt angle by using a deposition angle of 80°.

Furthermore, in the case of the deposition angles of 60° and 80°, an azimuthal direction, that is, liquid crystal alignment of a substrate in-plane direction, is rotated by 90°. In the above-mentioned patent document, since the deposition directions of the deposition angles of 60° and 80° are changed by 90°, the alignment orientations thereof are the same.

US Published Application No. 2006-0203171 discloses a method in which a notch portion is provided in a pixel electrode to change an electric field direction at the periphery of the notch portion, thereby forming a transfer nucleus of a splay/bend alignment transition.

Japanese Patent Application Laid-Open No. 2000-330141 discloses a method in which ultraviolet rays irradiate only a pixel region using a polyimide alignment film, where a pretilt angle is changed by ultraviolet irradiation, thereby setting a pretilt angle of the pixel region to be lower than a pretilt angle of an inter-pixel region.

However, if this method is used in a device where an alignment film is stacked in a display region such that a pretilt angle of the display region is lower than that of a peripheral region, a voltage that is actually applied to a liquid crystal layer may be lowered. If the notch portion is provided in the pixel electrode, the area of the pixel electrode may be decreased, thereby lowering reflectance. Furthermore, since an organic alignment film has weak resistance against light, it is difficult to use an organic alignment film in an environment where light with high intensity is used.

SUMMARY OF THE INVENTION

Accordingly, the present invention has been developed to solve the above-described problems, and it is an object of the present invention to provide a liquid crystal apparatus and a method of producing the same, in which a splay/bend alignment transition and maintenance of bend alignment after the transition are easy, retardation of a display region can be maintained at a high value, and the display quality is excellent, even though a structure, such as a notch portion, is not disposed in a pixel electrode or between pixels.

According to an aspect of the present invention, there is provided a liquid crystal apparatus that includes a display region where electrodes are disposed in a matrix pattern, a non-display region provided at a periphery of the display region, a liquid crystal disposed in the display region and the non-display region, the liquid crystal disposed in the display region being splay-aligned when a voltage is not applied and bend-aligned when the voltage is applied, the liquid crystal disposed in the non-display region being bend-aligned, and an alignment film containing an inorganic material as a main component provided in at least one of a pair of substrates. The thickness of the alignment film provided in the display region is smaller than the thickness of the alignment film provided in the non-display region.

According to another aspect of the present invention, there is provided a method of producing a liquid crystal apparatus that includes a display region where electrodes are disposed in a matrix pattern, a non-display region provided at a periphery of the display region, and a liquid crystal disposed in the display region and the non-display region. The method includes: the step of applying a beam of an inorganic material to at least one of a pair of substrates in an inclined direction to form a film; and the step of applying a beam of an inorganic material to the film of the non-display region in an inclined direction to stack a film or applying an ion beam different from the beam of the inorganic material to the film of the non-display region.

With the liquid crystal apparatus according to the aspect of the present invention, the thickness of the alignment film in the display region is set to have a small value so as to reduce the pretilt angle, thereby facilitating the splay/bend transition of the display region and improving the stability of the bend alignment. Furthermore, since the thickness of the alignment film in the display region can be set to have a small value, it is possible to prevent the effective voltage from being decreasing with respect to a liquid crystal layer. As a result, since the retardation of the display region can be maintained at a high value, the display quality can be improved.

Furthermore, the present invention provides a method of producing a liquid crystal apparatus in which the splay/bend alignment transition and maintenance of bend alignment after the transition can occur easily, the retardation of the display region can be maintained at a high value, and the display quality is excellent.

The alignment film in the display region can be irradiated with an ion beam, and the film density of the display region is reduced, thereby reducing the film thickness.

The present invention can be utilized in a liquid crystal display device using an alignment film formed by an oblique deposition process, and can be utilized in a display apparatus using the liquid crystal display device, for example, a projective display apparatus, such as a projector, a liquid crystal monitor, and a liquid crystal television.

Further features of the present invention will become apparent from the following description of exemplary embodiments with reference to the attached drawings.

DESCRIPTION OF THE EMBODIMENTS

First Embodiment

Figure 1:
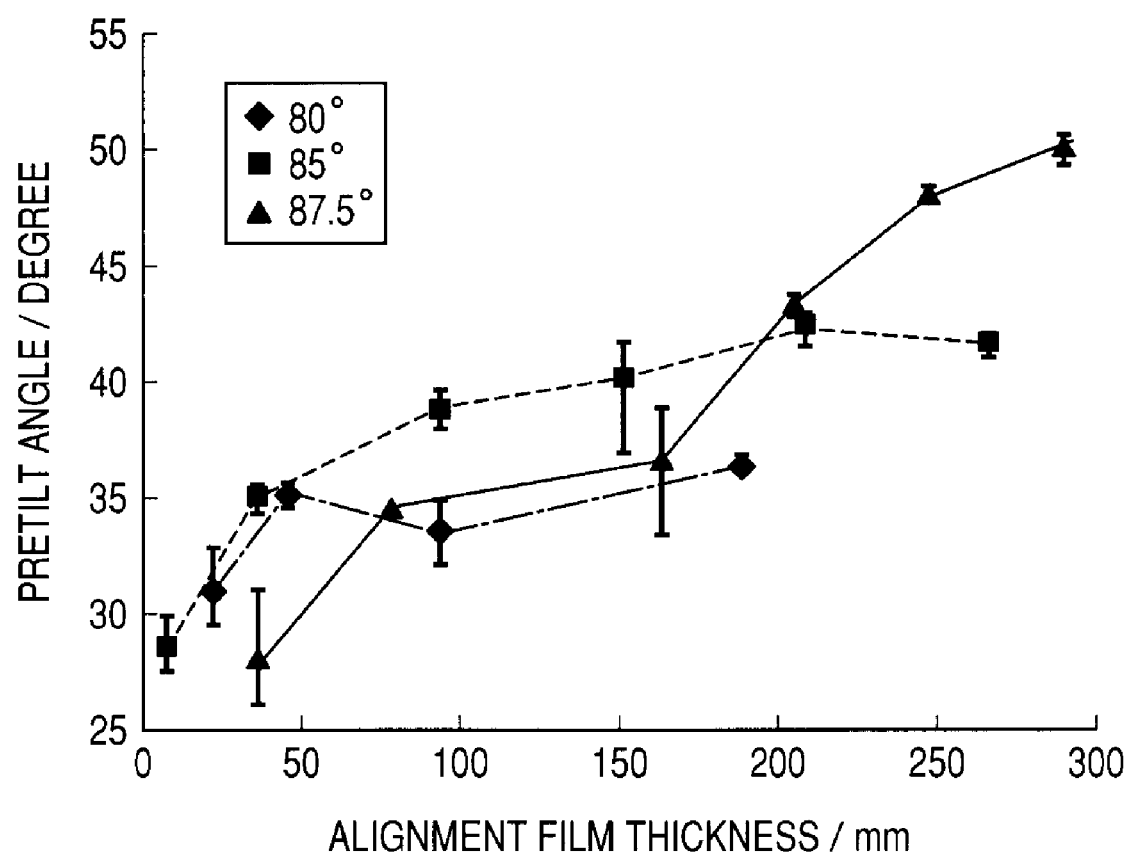
FIG. 1 is a graphical representation illustrating a relationship between the thickness of an alignment film and a pretilt angle in a liquid crystal apparatus according to an embodiment of the present invention.

FIG. 1 is a graphical representation illustrating a relationship between the thickness of a $SiO_2$ (silicon dioxide) film formed by an oblique deposition process and the pretilt angle. Specifically, FIG. 1 plots a result where deposition angles are measured as three of 80°, 85°, and 87.5°. The deposition angle is an angle of deposition measured from a normal line of a substrate, and a pretilt angle is an angle from a substrate plane, which is measured using a crystal rotation method. In general, the pretilt angle is increased together with an increase in the film thickness. As the deposition angle is increased, the pretilt angle and the film thickness are increased.

As shown in FIG. 1, in an alignment film formed by an oblique deposition method, when the deposition angle is a predetermined angle or more, the pretilt angle of liquid crystal is greatly changed depending on the film thickness. By using this phenomenon, if regions having different film thicknesses are formed, splay alignment and bend alignment can be separately formed in the same substrate plane.

It is known that when an electric field is applied, the alignment state of liquid crystal of a splay alignment region surrounded by a bend alignment region may be easily transited to a bend alignment state. Furthermore, it is also known that when the application of an electric field is stopped, the return from the bend alignment to the splay alignment is significantly late, and in some cases the inverse transition may be not generated.

That is, by providing a region that has a high pretilt angle around a display region, the alignment state of the display region can easily transited from the splay alignment state to the bend alignment state, and the bend alignment of the display region after the transition can be stabilized.

In the present invention, the pretilt angle of a non-display region that does not contribute to display is set to be high, a bend alignment state is formed at the time of not applying a voltage, thereby transiting the splay alignment of the display region to the bend alignment at a low voltage and suppressing an inverse transition of an alignment state of the display region from the bend alignment to the splay alignment.

In this embodiment, the change of the pretilt angle depending on the thickness of the alignment film is utilized.

Figure 2A:
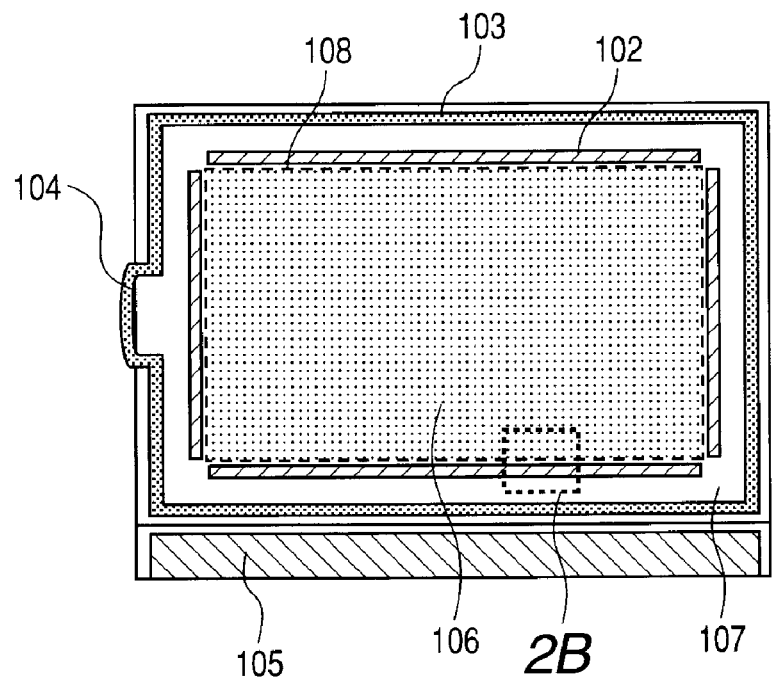
FIGS. 2A and 2B are schematic diagrams illustrating a liquid crystal apparatus according to an embodiment of the present invention.
Figure 2B:
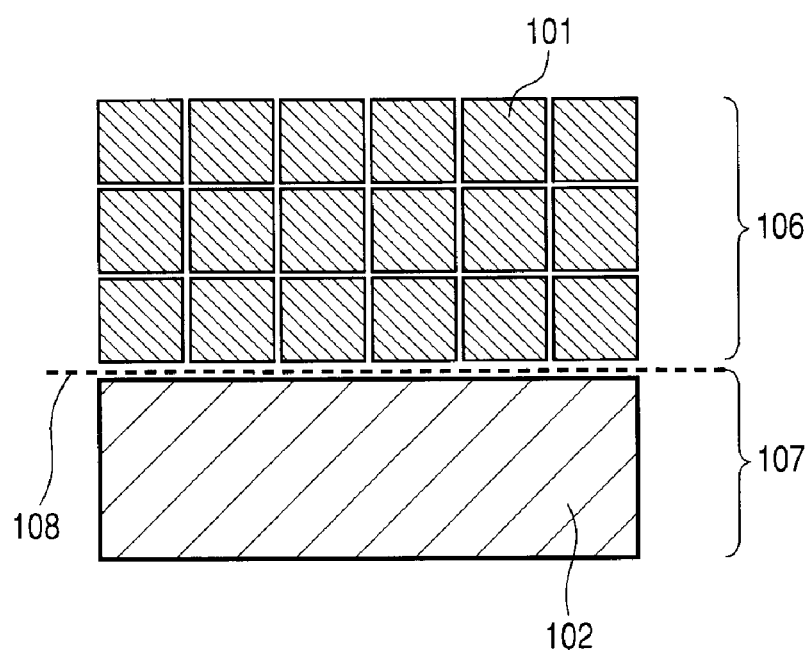

FIG. 2A is a plan view illustrating the configuration of a liquid crystal apparatus according to an embodiment of the present invention. FIG. 2B is an enlarged plan view illustrating a peripheral portion (region surrounded by broken line indicated with 2B in FIG. 2A) of a boundary portion between a display region 106 and a non-display region 107.

The inner region surrounded by a broken line in FIG. 2A is the display region 106. The non-display region 107 refers to a region between the display region 106 and a sealing portion 103. Reference numeral 101 denotes a pixel electrode, and reference numeral 108 denotes a boundary between the display region 106 and the non-display region 107.

Figure 3:
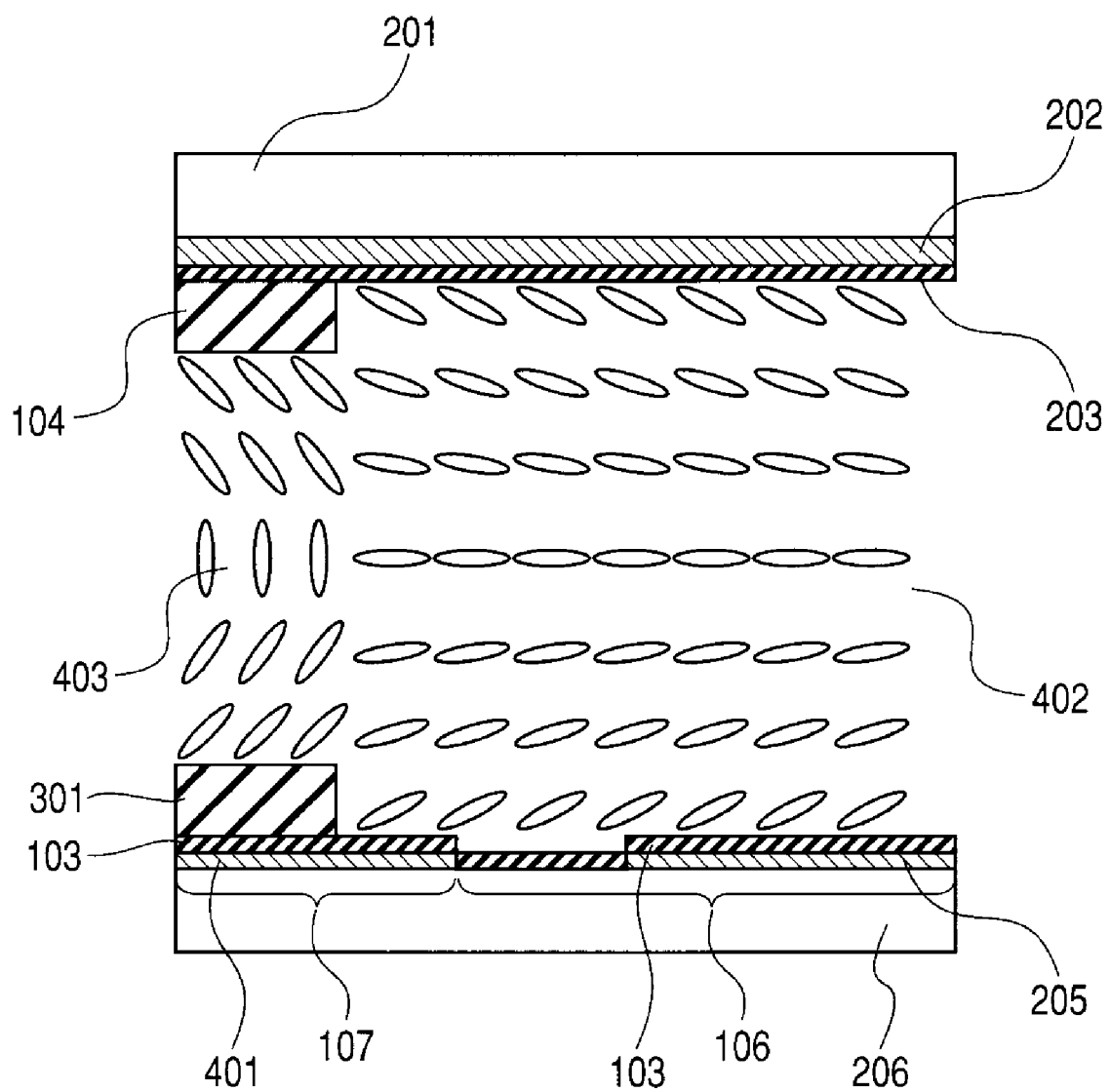
FIG. 3 is a cross-sectional view illustrating a boundary portion between a display region and a non-display region in a liquid crystal apparatus according to an embodiment of the present invention.

FIG. 3 is a cross-sectional view illustrating a peripheral portion of a boundary portion between a display region 106 and a non-display region 107 in a liquid crystal apparatus shown in FIGS. 2A and 2B.

A lower substrate 206 defines the display region 106 where a pixel electrode 205 is formed for every pixel. The display region 106 is a region where the pixel electrodes 205 are disposed in a matrix pattern. In the lower substrate 206, a first alignment film 103 is formed in both the display region 106 and the non-display region 107, and a second alignment film 301 is formed on the first alignment film 103 in the non-display region 107.

Meanwhile, on an upper substrate 201, a first alignment film is formed in a region that faces the display region 106 and the non-display region 107 of the lower substrate, and a second alignment film is formed in a region that faces the non-display region 107. As a result, a liquid crystal layer 402 of the display region 106 where the pretilt angle is low enters in a splay alignment state, and the liquid crystal layer 403 of the non-display region 107 where the pretilt angle is high enters in a bend alignment state. On the upper substrate, an electrode is formed and extends to the entire region facing the display region. This electrode is provided to extend even over the region facing the non-display region.

If a voltage is applied to the liquid crystal layer 402 of the display region 106, the bend alignment spreads from the peripheral non-display region 107 to the display region 106, and the entire display region enters in the bend alignment state. In general, when the bend alignment region does exist in the peripheral region, the bend transition is generated at a considerably high voltage, but when the bend alignment spreads from the peripheral region, the bend transition is generated at a lower voltage.

In FIG. 3, the upper and lower substrates face each other such that the deposition directions of the first and second alignment films when they are formed by the oblique deposition are in the same plane and liquid crystal molecules are inclined in the same direction. The deposition angle of the first alignment film 203 is set to have a proper pretilt angle and the thickness of the second alignment film 104 on the first alignment film is adjusted, thereby allowing an alignment state of the liquid crystal layer 402 of the display region at the time of not applying a voltage to enter in a splay alignment state and allowing an alignment state of the liquid crystal layer 403 of the non-display region to enter in a bend alignment state.

When an alignment film having a desired pretilt angle is formed by the oblique deposition of the $SiO_2$ (silicon dioxide) film, the film thickness is determined from the graph shown in FIG. 1. It is desirable that the thickness of the first alignment film is 10 nm or more and 200 nm or less, and preferably, 10 nm or more and 150 nm or less. Furthermore, it is desirable that the thickness of the second alignment film is 50 nm or more, and preferably 100 nm or more.

It is not preferable that the pretilt angle of the display region 106 be set high as with the non-display region 107 and the alignment state of the liquid crystal layer 402 is in the bend alignment state from the beginning. The reason is as follows. In the bend alignment where the pretilt angle is high, most of liquid crystal molecules including liquid crystal molecules in the vicinity of the substrate are aligned in almost a vertical direction, and a small amount of liquid crystal molecules are aligned in almost a horizontal direction. As a result, the refractive index anisotropy of the liquid crystal decreases, and effective optical characteristics cannot be obtained.

The liquid crystal alignment of the non-display region does not affect the display unit when an electric field is not applied, but becomes liable to spread to the liquid crystal alignment of the display region when the electric field is applied. For this reason, the second alignment film 104 of the non-display region is preferably formed distant from the outermost pixel electrode by a distance corresponding to the thickness of a liquid crystal cell.

In order to allow the bend alignment of the non-display region to easily spread to the display region, a transition electrode 102 may be provided in the boundary portion. When a voltage is applied to the transition electrode 102, it is possible to make the bend alignment of the non-display region further spread to the display region. The reason why the splay alignment is transited to the bend alignment is because the splay alignment is modified due to the electric field, thereby forming a structure similar to the structure when the voltage is applied to the bend alignment. In order to allow the splay alignment to be smoothly transited to the bend alignment, it is preferable that the alignment orientations of the display region and the non-display region be the same. When the first and the second alignment films are formed by the oblique deposition, if the deposition orientations (projection of a deposition direction vector with respect to a substrate plane) are equally set, the inclination orientations of columnar structure bodies are made uniform, and the alignment orientations can be made to be equal to each other.

The transition electrode 102 is separated from the pixel electrode and is disposed along the outer periphery of the pixel electrode. When the distance between the transition electrode 102 and the display region 106 is decreased, the splay/bend transition is quickly transferred to the pixel electrode 101. If the transition electrode 102 is provided on a layer different from the pixel electrode 101, for example, an insulating layer is provided between the transition electrode 102 and the pixel electrode 101, the transition electrode 102 may be provided in contact with the display region 106.

Hereinafter, other configuration of the liquid crystal apparatus shown in FIGS. 2A to 3 will be described.

The liquid crystal material used is a nematic liquid crystal and a material having positive dielectric anisotropy is used.

As the sealing portion 103 and a seal section 104 shown in FIG. 2A, an adhesive used in a conventional liquid crystal apparatus is applied. In this case, the material is not limited in particular, as long as the material does not exert a bad influence upon a liquid crystal material sealing region (not shown) surrounded by the sealing portion 103 and the seal section 104, for example, and the material does not disturb the liquid crystal alignment or does not degrade durability and weatherability.

Spacer beads (not shown) are mixed in the sealing portion 103 in order to hold the cell thickness of the liquid crystal apparatus, that is, a gap between the upper and the lower substrates. The spacer beads can be appropriately selected depending on the desired cell thickness.

An extraction electrode 105 is used to connect an external apparatus in order to supply a driving voltage to an active matrix circuit, such as a thin film transistor (TFT), which is connected to the pixel electrode 101 of the display region 106, or the transition electrode 102 and a counter electrode 202 (which are described later).

Since the upper substrate 201 needs to transmit light, the upper substrate 201 is formed by using a material, such as glass, which has light transmissivity. Since the counter electrode 202 is also required to have light transmissivity, the counter electrode 202 needs to be formed by using a transparent electrode made of ITO and the like.

The lower substrate 206 uses a material having light transmissivity in the case of a light-transmissive liquid crystal apparatus, and an active matrix circuit that drives the pixel electrode 205 is formed on the lower substrate 206. At this time, the pixel electrode 205 is a transparent electrode. In the case of a reflective liquid crystal apparatus, the pixel electrode 205 is a reflective electrode that reflects incident light, as described above.

In this invention, the alignment film that uses an inorganic material as a main component is used. Furthermore, the materials of the first and the second alignment films may be the same or different from each other.

Examples of the inorganic material may include oxides; for example, silicon oxide ($SiO_x$: x being about 1-2), such as silicon dioxide ($SiO_2$) and silicon monoxide (SiO), magnesium oxide (MgO), aluminium oxide ($Al_2O_3$), zinc oxide (ZnO), titanium oxide ($TiO_2$), zirconium oxide ($ZrO_2$), chromium oxide ($Cr_2O_3$), cobalt oxide ($Co_3O_4$), and iron oxide ($Fe_2O_3$ or $Fe_3O_4$); fluorides, such as magnesium fluoride ($MgF_2$); and nitrides, such as silicon nitride (SiNx) and aluminium nitride (AlN).

The liquid crystal alignment film may be a film that uses any one of the above-described inorganic materials as a main component or a film where two components are mixed with each other. In particular, the silicon oxide (SiOx), such as silicon dioxide ($SiO_2$) and silicon monoxide (SiO), can be used to control a liquid crystal alignment state according to a film formation condition relatively freely.

The first alignment film 203 may be produced using any production process. For example, the production process may be a physical vapor deposition (PVD) process such as a deposition process and a sputtering process, a chemical vapor deposition (CVD) process or a wet process such as a sol-gel process.

Among the above-described processes, if the first alignment film is produced by a process that is generally called an oblique deposition process, it is possible to obtain a structure body in which a plurality of minute columnar structure bodies are inclined with respect to a normal line of the substrate and grown. If this structure body is used, the alignment control of the liquid crystal molecules can be easily performed. Accordingly, the oblique deposition process is a preferable production process.

Figure 4:
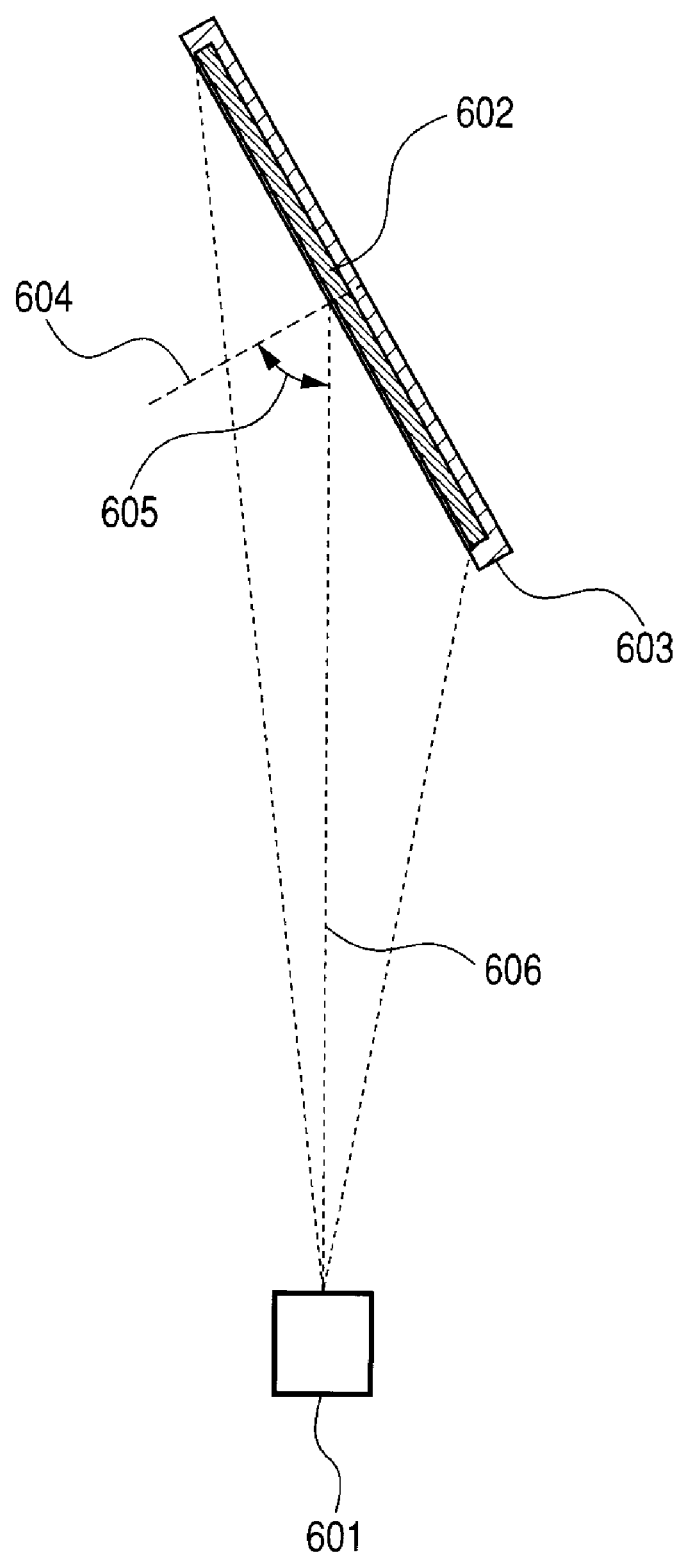
FIG. 4 is a schematic diagram illustrating an oblique deposition apparatus.

The oblique deposition process is performed using an apparatus such as shown in FIG. 4. A particle beam evaporated from a deposition source 601 is applied to a substrate 602, thereby forming a film. Reference numeral 604 denotes a substrate normal line. If a deposition distance 606 is small, a deposition angle 605 is not constant in a substrate plane. In order to cause the deposition angle 605 to be uniform in the substrate plane, a shielding plate that has a slit formed therein can be provided between the deposition source 601 and the substrate 602, thereby moving the substrate. A substrate holder 603 that holds the substrate 602 is rotatable and the deposition angle 605 can be arbitrarily set.

Second Embodiment

In the first embodiment, the pretilt angle is changed depending on the thickness of the oblique deposition film. In this embodiment, the oblique deposition film is formed to have a constant film thickness, and the display region is irradiated with an ion beam, such that the pretilt angle of the display region becomes smaller than that of the non-display region. The inventors have found the fact that only a pretilt angle of an ion beam irradiation region can be selectively lowered by irradiating the oblique deposition film with an ion beam from a constant direction.

Figure 5A:
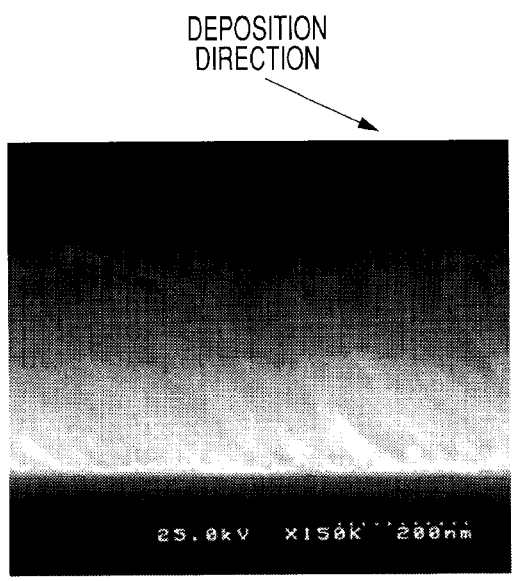
FIG. 5A is an electron microphotograph illustrating a section of an ion beam irradiation portion.
Figure 5B:
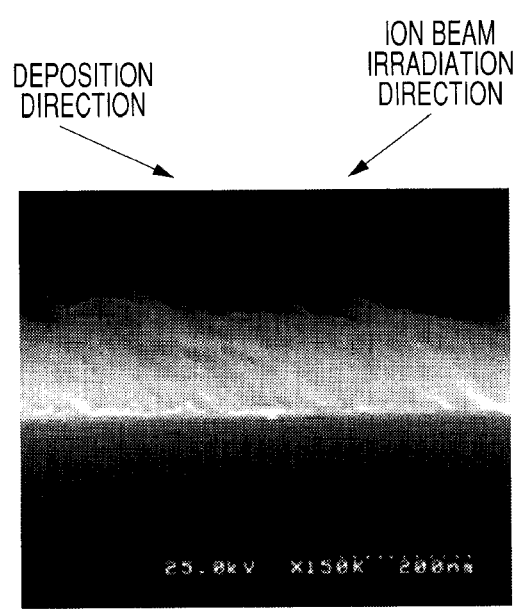
FIG. 5B is an electron microphotograph illustrating a section of an ion beam non-irradiation portion.

FIG. 5A is an electron microphotograph illustrating an observation result of a section of an oblique deposition film of $SiO_2$ and FIG. 5B is an electron microphotograph illustrating an observation result of a section of columnar structure bodies after irradiating the oblique deposition film with an ion beam.

The deposition angle of the oblique deposition process was 87.5° and the film thickness was 300 nm. In a direction shown in FIG. 5B, argon ions irradiated a substrate for five minutes in a state where the irradiation angle with respect to a normal line of the substrate was set as 45°.

From the result of the comparison between FIG. 5A and FIG. 5B, it can be seen that the columnar structure bodies are maintained after the substrate is irradiated with the ion beam, and the thickness of the film after the ion beam irradiation is reduced because the tip ends of the columnar structures are deformed.

Furthermore, the film density was measured using spectral ellipsometry.

On the assumption that the refractive indexes of a material that forms the columnar structure body and a medium (air, thus, n=1) that fills a gap are already known, after the refractive index of the alignment film was measured by the spectral ellipsometry, the film density was calculated by analysis using an effective medium approximation (EMA) process.

Figure 6:
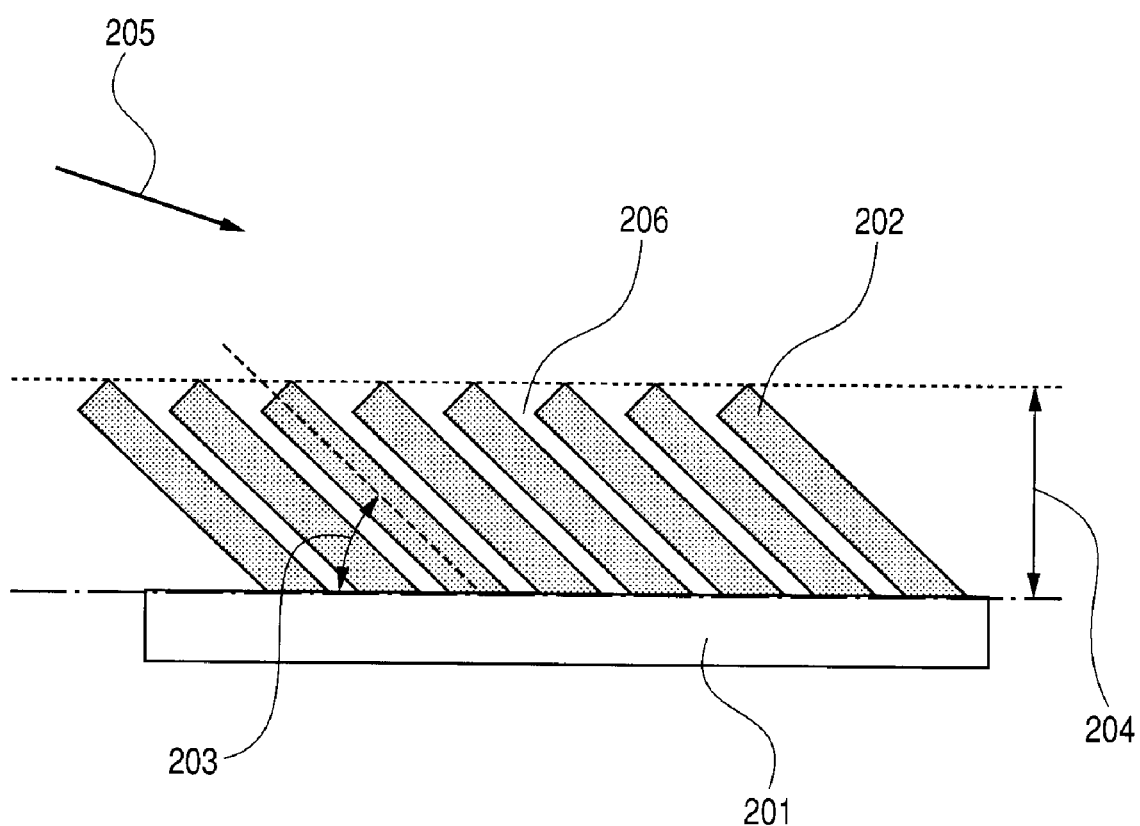
FIG. 6 is a conceptual diagram illustrating a sectional structure of an alignment film according to an embodiment of the present invention.

FIG. 6 is a conceptual diagram illustrating the columnar structure of an alignment film in section. In this case, reference numeral 201 denotes a substrate, reference numeral 202 denotes a columnar structure body, reference numeral 203 denotes an inclination angle of the columnar structure body, reference numeral 204 denotes a film thickness, reference numeral 205 denotes a deposition direction, and reference numeral 206 denotes a gap.

The film density of the alignment film depends on the ratio between the columnar structure bodies 202 and the gaps 206 that exist between the columnar structure bodies. The film density is an amount that indicates the ratio of the gaps. The film density is assumed as 100%, when the refractive index of the columnar structure body material that has no gap is used as a reference. In this case, if the ratio of the gaps is increased, the refractive index is decreased.

As the result of the spectral ellipsometry measurement, the film density of a film to which an ion beam was not applied was 0.21 and the film density of a film to which an ion beam is applied was 0.76. Accordingly, it can be seen that the film density of the ion beam irradiation portion is higher than the film density of the ion beam non-irradiation portion. This result also indicates that the thickness of the oblique deposition film is reduced by ion beam irradiation.

Thus, if the oblique deposition film is irradiated with the ion beam, the film thickness is decreased and the pretilt angle is decreased.

In this embodiment, by utilizing this phenomenon, the oblique deposition film is uniformly formed in the display region and the non-display region, and only the display region is irradiated with an ion beam such that the liquid crystal of the display region at the time of not applying an electric field is splay-aligned and the liquid crystal of the non-display region is bend-aligned.

The deposition angle when an inorganic film is formed by the oblique deposition process is preferably 60° or more and less than 90°.

Preferably, the value of the film density of the alignment film of the display region is 0.5 or more and 1.0 or less, and the value of the film density of the alignment film of the non-display region is 0.1 or more and 0.7 or less. Furthermore, the difference of (the film density of the alignment film of the display region)−(the film density of the alignment film of the non-display region) is preferably 0.1 or more.

Figure 7:
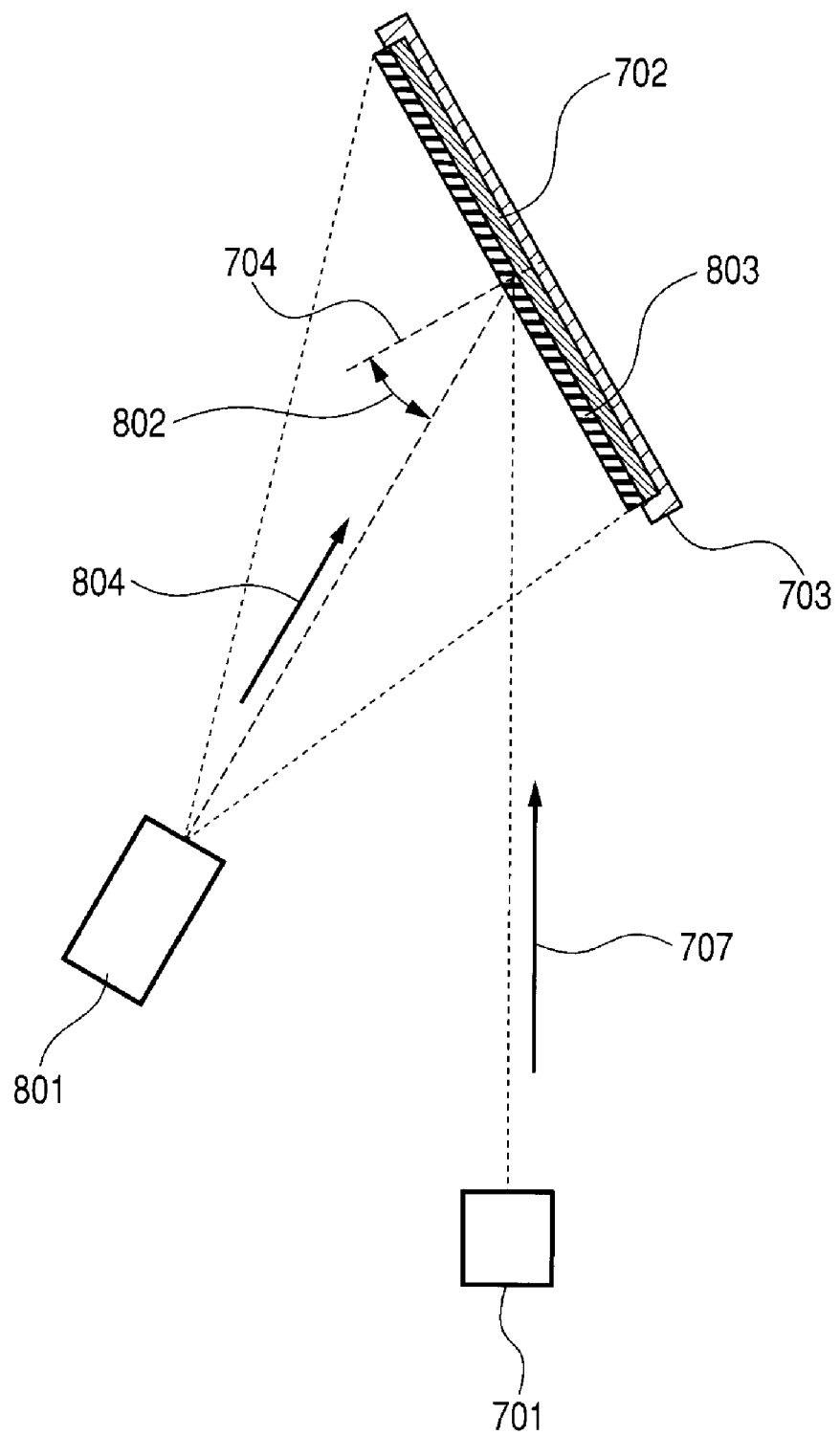
FIG. 7 is a schematic diagram illustrating an ion beam irradiation apparatus.

FIG. 7 is a schematic diagram illustrating an apparatus that performs both deposition and ion beam irradiation. Reference numeral 701 denotes a deposition source, reference numeral 702 denotes a substrate, reference numeral 703 denotes a substrate holder, reference numeral 704 denotes a substrate normal line, and reference numeral 707 denotes a deposition direction. Reference numeral 801 denotes an ion source, reference numeral 802 denotes an ion beam irradiation angle, reference numeral 803 denotes an oblique deposition film, and reference numeral 804 denotes an ion beam irradiation direction. The irradiation angle is the angle 802 that the ion beam forms with respect to the normal line 704 of the substrate.

The ion beam irradiation direction 804 is in a plane that includes the deposition direction 707 and the substrate normal line 704. If the position of the ion source is changed in the plane, the ion beam irradiation angle is changed.

Figure 8A:
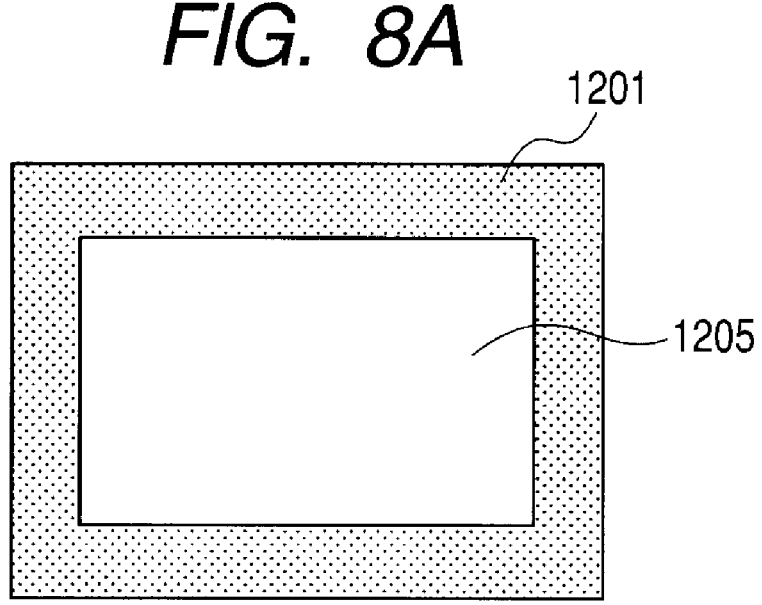
FIG. 8A is a diagram illustrating a structure of a mask used in a method of producing a liquid crystal apparatus according to an embodiment of the present invention.
Figure 8B:
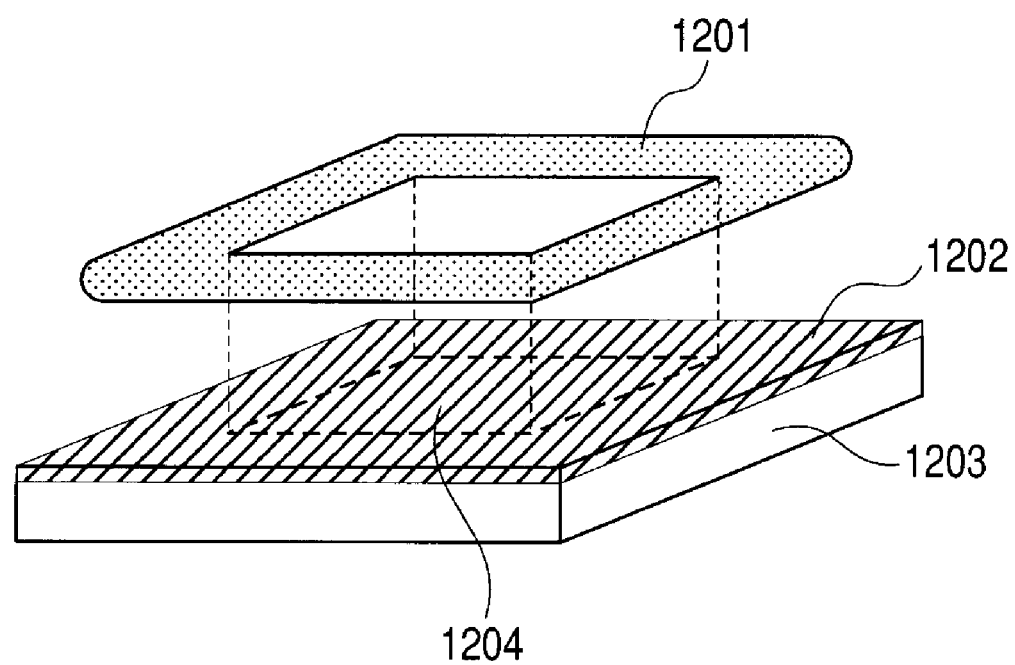
FIG. 8B is a diagram illustrating the state of disposal of the mask with respect to a substrate.

As a method of applying an ion beam to only the portion that corresponds to the display region, a mask 1201 with an opening 1205 corresponding to the display region is used as shown in FIGS. 8A and 8B. The mask 1201 is disposed on a substrate 1203 where an alignment film 1202 is formed by the oblique deposition, and the display region 1204 is irradiated with an ion beam through the opening 1205, thereby blocking the ion beam from flying to the non-display region.

EXAMPLES

Hereinafter, the embodiment of the present invention will be described in detail using examples. However, the present invention is not limited to the examples.

Example 1

This example is an example where an oblique deposition film having a deposition angle of 85° and a film thickness of 40 nm (400 Å) and made of silicon oxide (SiOx) is selected as a first alignment film and an oblique deposition film having a deposition angle of 87.5° and a film thickness of 240 nm (2400 Å) is selected as a second alignment film, and a liquid crystal apparatus is produced.

In this example, a Si substrate and a glass substrate where a transparent electrode is formed are used as the pair of substrates 206 and 201 of FIG. 3, respectively. The Si substrate includes a plurality of pixel electrodes (refer to 205 of FIG. 3) formed in the display region and an alignment transition electrode 401 formed outside the display region. Furthermore, the Si substrate includes a MOS transistor circuit to apply a voltage to the above electrodes. Hereinafter, the Si substrate and the glass substrate are simply described as the "substrates". However, the same alignment film is formed in both the substrates.

First, an alignment film to be the alignment film (first alignment film) of the display region is formed on the substrate using the oblique deposition. The substrate is held by the substrate holder 603 of the oblique deposition apparatus of FIG. 4, the substrate holder 603 is inclined such that the deposition angle 605 becomes 85°, the inorganic material is evaporated by the deposition source 601, and a beam of the evaporated inorganic material particle is adhered to the substrate 602. The film thickness is detected by a separately provided film thickness monitor, and the deposition is stopped when the film thickness becomes 40 nm (400 Å).

Next, a mask (not shown) that shields the display region is disposed so as to slightly float the mask from the substrate. In this state, the deposition is performed again and the second alignment film is formed in the non-display region. The conditions other than the deposition angle are the same as those in the case where the first alignment film is formed. The second alignment film is formed to be stacked on the first alignment film. The thickness of the second alignment film was set to 240 nm (2400 Å).

The pretilt angle is measured using a separately produced pretilt angle measuring substrate. Two pairs of substrates where the first alignment film and the second alignment film are formed over the entire surfaces thereof, the substrates having the same alignment film are bonded to each other, and each pretilt angle is measured. As the liquid crystal used was MLC-2050 (manufactured by Merck & Co.).

As a result, the pretilt angle of the first alignment film was 35.0° and the pretilt angle of the second alignment film was 48.1°.

A liquid crystal cell for observing an alignment was formed as follows. The Si substrate and the glass substrate where the alignment films were separately formed in the display region and the non-display region were bonded in a facing state so that the deposition directions thereof were parallel to each other, and liquid crystal (MLC-2050) was injected.

The liquid crystal cell was inserted between two polarization plates disposed with cross nicol arrangement and was observed. The display region where only the first alignment film was formed was colored with a bright color, and the non-display region where the second alignment film was stacked was colored with a black color. Thus, it could be confirmed that the liquid crystal layer forms splay alignment in the display region and forms bend alignment in the non-display region.

When a voltage is applied, the alignment state of the splay alignment region is transited to the bend alignment. The state at this time is shown in FIGS. 9A to 9C.

Figure 9A:
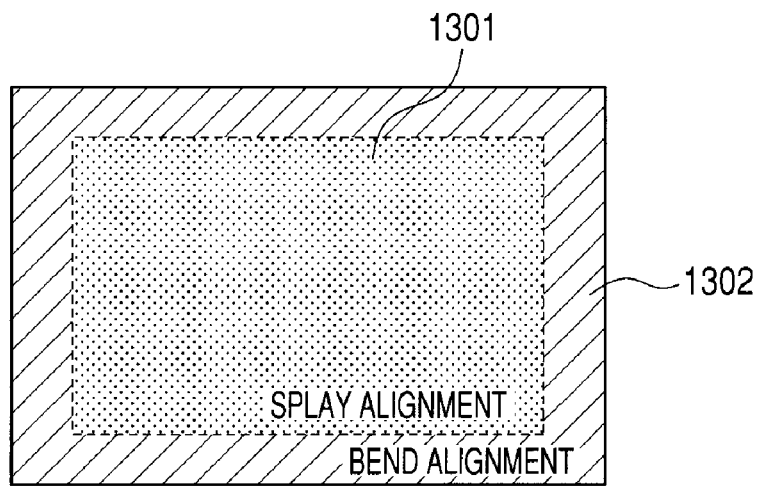
FIGS. 9A, 9B and 9C are diagrams illustrating changes in alignment depending on an application of a voltage in a liquid crystal apparatus according to an embodiment of the present invention.
Figure 9B:
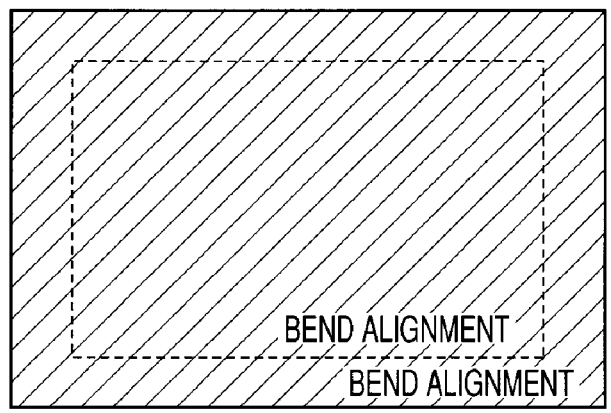
Figure 9C:
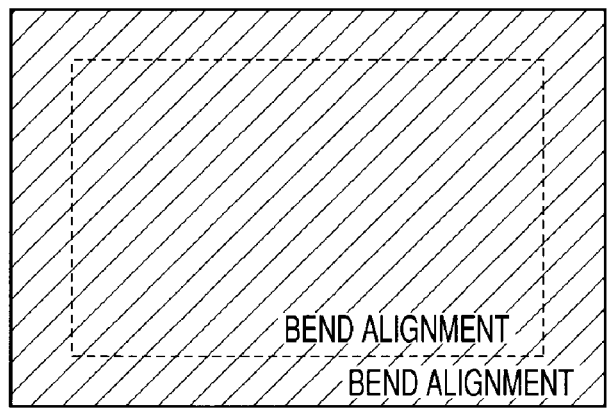

The initial alignment state is shown in FIG. 9A.

A rectangular wave voltage having a frequency of 60 Hz is applied to the transition electrode disposed at the periphery of the display region and the pixel electrode of the display region, while the rectangular wave voltage is gradually increased. The transition to the bend alignment starts at an application voltage of 1.3 V or more, and the entire display region is bend-aligned several seconds after the voltage of 1.5 V is applied, as shown in FIG. 9B.

Then, the voltage application was completed, the voltage non-application state was maintained, and the change in the alignment state was observed. However, the inverse transition to the splay alignment was not observed, and the bend alignment was maintained, as shown in FIG. 9C.

Comparative Example 1

A liquid crystal cell was produced by following the same procedure as in Example 1 with the exception that only the first alignment film was formed and the second alignment film was not stacked.

At the time of confirming the alignment state, the entire surface is splay-aligned.

Figure 10A:
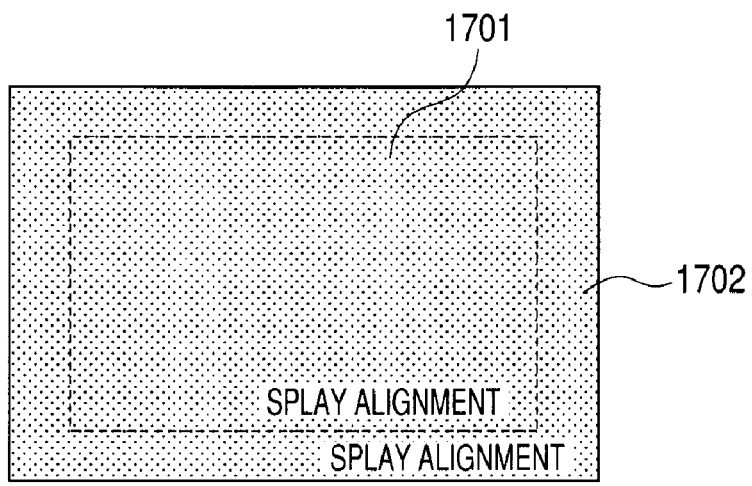
FIGS. 10A, 10B and 10C are diagrams illustrating changes in alignment depending on an application of a voltage in a liquid crystal apparatus according to comparative examples.
Figure 10B:
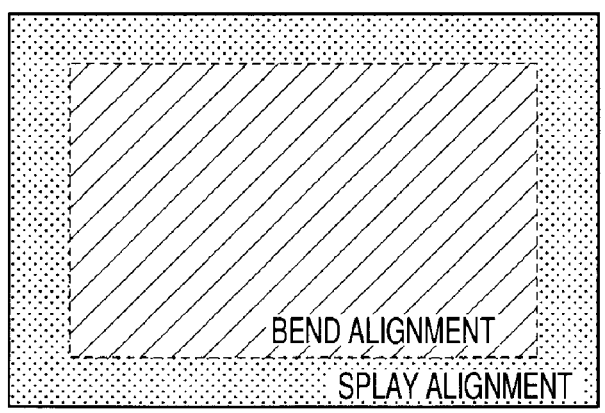
Figure 10C:

The change in alignment when the voltage is applied to the display region is shown in FIGS. 10A to 10C. From an initial state (FIG. 10A), a voltage larger than or equal to a transition voltage was applied to form the bend alignment (FIG. 10B). When the voltage application was completed, the inverse transition to the splay alignment was generated after several seconds (FIG. 10C).

Comparative Example 2

A liquid crystal cell was produced by following the same procedure as in Example 1 with the exception that the second alignment film was stacked on the entire surface of the first alignment film.

At the time of observing the alignment state, the alignment state was the entire surface bend alignment in a voltage non-application state.

Example 2

An ion assist process in which an ion beam is simultaneously applied when a first alignment film is formed by oblique deposition is disclosed in U.S. Pat. No. 5,268,781. The present example is an example in which an oblique deposition film formed by an ion assist process is selected as a first alignment film and an ordinary oblique deposition film is selected as a second alignment film.

On a substrate, using an end-hole-type ion source, oblique deposition was performed while Ar ions were applied. The deposition angle was 85°, the ion beam irradiation angle was 50°, the cathode voltage of the ion source was 100 V, and the cathode current was 5 A. When a first alignment film was produced under the above conditions, the pretilt angle was 32.1°.

On the first alignment film, a second alignment film in which the deposition angle was 87.5° and the film thickness was 2400 Å was formed using the same mask as that in the case of Example 1.

When a liquid crystal cell was produced by using the film and evaluation was performed, the same alignment state as that in the case of Example 1 was obtained. A voltage was applied to the display region, and the bend alignment was maintained even after the bend transition.

Example 3

The present example is an example in which a first alignment film is not formed on a counter electrode substrate. In this case, a liquid crystal cell was produced by following the same procedure as that in the case of Example 1 with the first alignment film was not formed.

As with Example 1, according to the first inorganic alignment film formation condition, the deposition angle was 85° and the film thickness was 40 nm (400 Å). According to the second alignment film formation condition, the deposition angle was 87.5° and the film thickness was 240 nm (2400 Å).

As is the case with Example 1, only a portion where the second alignment film was not formed entered in a splay alignment state, and the other portion entered in a bend alignment state.

Example 4

An Ar ion beam irradiated a substrate from a direction opposite to an inclination direction of a columnar structure body at a portion thereof at which an oblique deposition film was formed, made of silicon oxide ($SiO_x$) and having a deposition angle of 87.5° and a film thickness of 300 nm, thereby forming an alignment film.

At this time, the pretilt angle was 48.1°.

A portion of the oblique deposition film substrate was irradiated with an ion beam.

A mask, in which only a portion corresponding to the display region was opened, was disposed on the substrate. Then, each substrate was disposed such that an ion beam irradiated each substrate from the same direction as a SiOx column growth direction, that is, from the same direction as a deposition direction at the time of the oblique deposition, using the ion beam irradiation apparatus shown in FIG. 7. The ion source was an end-hole-type ion source (manufactured by Veeco), and the irradiation angle was set to 45°, and the cathode voltage of 300 V and the cathode current of 10 A were set as the irradiation conditions. At the time when ion beam emission was stabilized, a shutter provided between the ion source and the substrate was opened, and ion beam irradiation started. The irradiation was performed for five minutes.

The pretilt angle after the ion beam irradiation was measured. At this time, the pretilt angle was 35° in the ion beam irradiation portion and 44° in the portion not irradiated by the ion beam.

The two substrates thus provided with the films were made to face each other such that the ion beam irradiation regions overlap, and a liquid crystal (MLC-2050 manufactured by Merck & Co.) was injected.

The liquid crystal cell was inserted between the two polarization plates disposed with cross nicol arrangement and was observed. The ion beam irradiation region was colored with a bright yellow color and the ion beam non-irradiation region was colored with a black color. From this point, it could be confirmed that the liquid crystal formed splay alignment in the ion beam irradiation region and formed bend alignment in the ion beam non-irradiation region.

Comparative Example 3

A liquid crystal apparatus was produced by the same procedure as that in Example 4 with the exception that the entire surface is irradiated with the ion beam.

In this Comparative Example, since the entire surface was irradiated with the ion beam, the pretilt angles in the display region and the non-display region became lower than the pretilt angle of the original oblique deposition film and became 28°, and the alignment states of the display region and the non-display region entered in a splay alignment state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-180739, filed Jul. 10, 2008 and 2008-183139, filed Jul. 14, 2008, which are hereby incorporated by reference herein in their entirety.

What is claimed is:

1. A liquid crystal apparatus comprising:
a display region in which electrodes are disposed in a matrix pattern;
a non-display region provided at a periphery of the display region;
a liquid crystal disposed in the display region and the non-display region,
wherein the liquid crystal disposed in the display region is splay-aligned when a voltage is not applied and bend-aligned when the voltage is applied,
wherein the liquid crystal disposed in the non-display region is bend aligned; and
an alignment film provided in the display and non-display regions and comprising an inorganic material provided in at least one of a pair of substrates, the thickness of the alignment film provided in the display region being smaller than the thickness of the alignment film provided in the non-display region.

2. The liquid crystal apparatus according to claim 1, wherein the film density of the alignment film provided in the display region is higher than the film density of the alignment film provided in the non-display region.

3. The liquid crystal apparatus according to claim 1, further comprising a transition electrode disposed along the non-display region at a periphery of the display region.

4. The liquid crystal apparatus according to claim 1, wherein the alignment film comprises an inclined columnar structure body, whose inclination orientation is equal for the display region and the non-display region.

5. The liquid crystal apparatus according to claim 1, wherein the inorganic material is silicon oxide.

* * * * *